(12) United States Patent
Akiyama

(10) Patent No.: US 7,792,388 B2
(45) Date of Patent: Sep. 7, 2010

(54) CONTROLLING FORMAT OF A COMPOUND IMAGE

(75) Inventor: Toshio Akiyama, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 999 days.

(21) Appl. No.: 11/508,181

(22) Filed: Aug. 23, 2006

(65) Prior Publication Data

US 2008/0219553 A1 Sep. 11, 2008

(30) Foreign Application Priority Data

Aug. 23, 2005 (JP) ............................. 2005-241872
Aug. 4, 2006 (JP) ............................. 2006-213340

(51) Int. Cl.
*G06K 9/32* (2006.01)
*G06K 9/34* (2006.01)
(52) U.S. Cl. ...................... 382/284; 382/173; 382/298
(58) Field of Classification Search ...................... None
See application file for complete search history.

(56) References Cited

U.S. PATENT DOCUMENTS

| 5,914,728 | A | * | 6/1999 | Yamagishi et al. ........... 345/565 |
| 6,057,842 | A | * | 5/2000 | Knowlton et al. ............ 715/788 |
| 6,310,601 | B1 | * | 10/2001 | Moore et al. ................. 345/660 |
| 6,587,596 | B1 | * | 7/2003 | Haeberli ...................... 382/283 |
| 6,982,729 | B1 | * | 1/2006 | Lange et al. ................. 345/660 |
| 7,224,832 | B2 | * | 5/2007 | Yamada ....................... 382/166 |
| 7,257,771 | B2 | * | 8/2007 | Buser et al. .................. 715/239 |
| 7,278,117 | B2 | * | 10/2007 | Gargi .......................... 715/864 |
| 2002/0011970 | A1 | * | 1/2002 | Richard ........................ 345/30 |
| 2002/0097415 | A1 | * | 7/2002 | Chang et al. ............... 358/1.13 |

FOREIGN PATENT DOCUMENTS

| JP | 04-236574 | 8/1992 |
| JP | 2003-244447 | 8/2003 |
| JP | 2004-221633 | 8/2004 |
| JP | 2004-221679 | 8/2004 |
| JP | 2004-227406 | 8/2004 |

* cited by examiner

*Primary Examiner*—Yuzhen Ge
(74) *Attorney, Agent, or Firm*—Oblon, Spivak, McClelland, Maier & Neustadt, L.L.P.

(57) ABSTRACT

A source image having a foreground section and a background section is segmented into a first image corresponding to the foreground section and a second image corresponding to the background section. Using size information of the source image, a pixel size of the first image and a pixel size of the second image are determined. The determined pixel sizes of the first image and the second image are used to generate a formatting file of a compound image.

11 Claims, 12 Drawing Sheets

FIG. 6

| NAME? | INPUT NAME |
|---|---|

ROAST BEEF

| NAME? | INPUT NAME |
|---|---|

| NAME? | INPUT NAME |
|---|---|

SERVED WITH SALAD AND COFFEE/TEA

| NAME? | INPUT NAME |
|---|---|

| NAME? | INPUT NAME |
|---|---|

ITALIAN
PASTA WITH TOMATO SAUCE

| NAME? | INPUT NAME |
|---|---|

| NAME? | INPUT NAME |
|---|---|

SERVED FRESH

US 7,792,388 B2

CONTROLLING FORMAT OF A COMPOUND IMAGE

CROSS-REFERENCE TO RELATED APPLICATIONS

This patent application is based on and claims priority to Japanese patent application Nos. 2005-241872 filed on Aug. 23, 2005, and 2006-213340 filed on Aug. 4, 2006, in the Japanese Patent Office, the entire contents of which are hereby incorporated by reference.

FIELD OF THE INVENTION

The following disclosure relates generally to an apparatus, method, system, computer program and product, each capable of controlling format of a compound image.

DESCRIPTION OF THE RELATED ART

While many contents on the web site are generated using a HyperText Markup Language (HTML), some contents on the web site are generated using a Portable Document Format (PDF) especially when the content includes a compressed image. In order to display the PDF content with a general-purpose web browser, a user may need to download the PDF plug-in. Further, displaying the PDF content on the webpage may slow down the speed for loading the contents from the web site.

BRIEF SUMMARY OF THE INVENTION

An example embodiment of the present invention includes an apparatus, method, system, computer program and product, each capable of controlling format of a compound image.

In one example, a source image having a foreground section and a background section is segmented into a first image corresponding to the foreground section and a second image corresponding to the background section. Using size information of the source image, a pixel size of the first image and a pixel size of the second image are determined. The determined pixel sizes of the first image and the second image are used to generate a formatting file of a compound image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is an illustration for explaining how a compound image is displayed when a form tag is used, when no image is set as a background image;

DETAILED DESCRIPTION OF THE INVENTION

Figure 1:
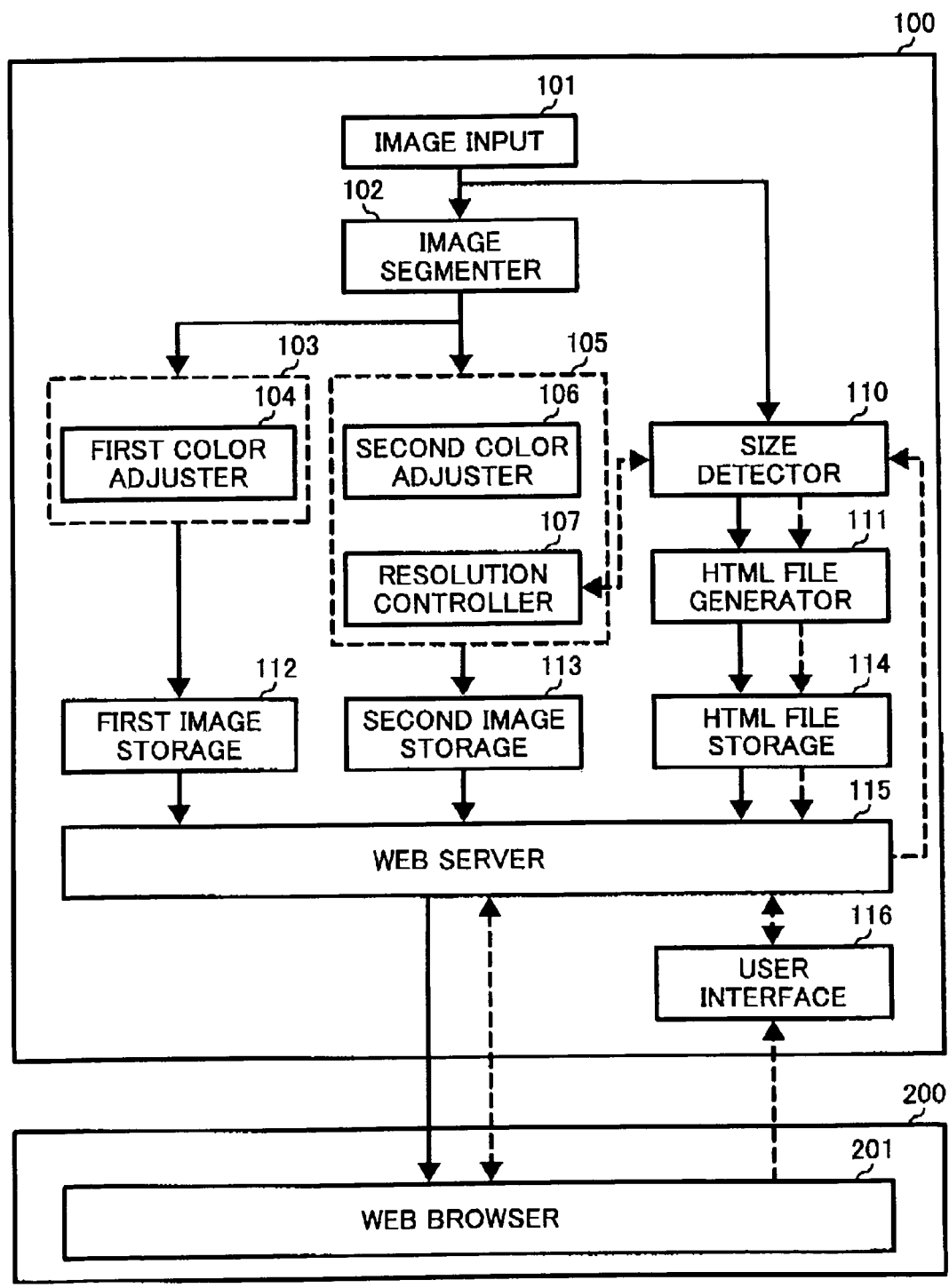
FIG. 1 is a schematic block diagram illustrating the functional structure of an image processing apparatus according to an example embodiment of the present invention.

In describing the example embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, FIG. 1 illustrates an image processing apparatus 100 according to an example embodiment of the present invention.

In this example, the image processing apparatus 100 functions as a server apparatus, which communicates with a client apparatus 200 via a network. For example, upon receiving a user instruction from the client apparatus 200, the image processing apparatus 100 sends a first image and a second image together with a formatting file to the client apparatus 200. The client apparatus 200 displays the first image and the second image as a compound image, using information obtainable from the formatting file.

As shown in FIG. 1, the image processing apparatus 100 includes an image input 101, an image segmenter 102, a first image processor 103, a second image processor 105, a size detector 110, a HTML file generator 111, a first image storage 112, a second image storage 113, a HTML file storage 114, a web server 115, and a user interface 116. The client apparatus 200 includes a web browser 201.

The image input 101 inputs a source image. The source image may be obtained by, for example, a scanner, a digital camera, or any kind of storage medium such as an optical disc. Alternatively, the source image may be generated by any kind of application program, which may be stored in the image processing apparatus 100 or the client apparatus 200. In this example, the image processing apparatus 100 inputs a source image Io shown in FIG. 3, which is a multivalue image having the character portion (indicated by "AB" and "123" in FIG. 3) and the picture portion (indicated by the picture and the gray area). In this example, the character portion is referred to as a foreground section of the source image Io, while the picture portion is referred to as a background section of the source image Io.

Figure 3:
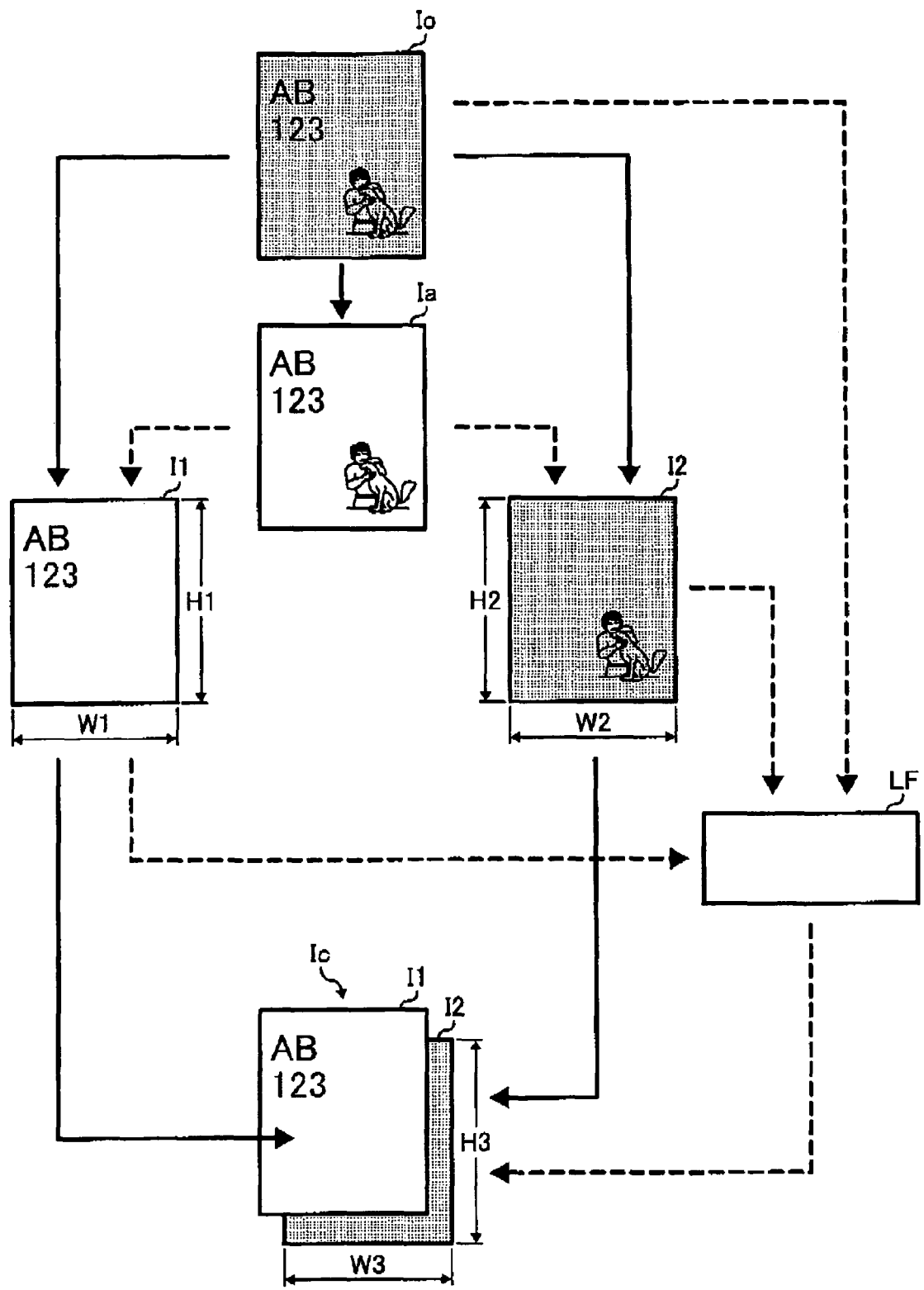
FIG. 3 is an example illustration for explaining operation of generating a compound image, performed by the image processing apparatus shown in FIG. 1, according to an example embodiment of the present invention.

The image segmenter 102 of FIG. 1 segments the source image Io into a first image I1 corresponding to the foreground section and a second image I2 corresponding to the background section, using any kind of image segmentation method. In one example, as illustrated in FIG. 3, the image segmenter 102 may convert the source image Io from multi-value to binary to generate a binary image Ia. Using the binary image Ia, the image segmenter 102 extracts a continuous run of black pixels as the foreground section of the source image Io, and generates the first image I1 corresponding to the foreground section. The image segmenter 102 generates the second image I2 corresponding to the background section, which is a section other than the foreground section of the source image Io. When extracting the foreground section of the source image Io, the image segmenter 102 may use other types of information obtainable from the source image Io or the binary image Ia including, for example, texture such as edges or shapes, or color such as color difference among pixels.

The first image processor 103 applies lossless compression, such as Graphics Interchange Format (GIF) or Portable Network Graphics (PNG), to the first image I1 to reduce the file size of the first image I1. In this example, the first color adjuster 104 of the first image processor 103 reduces the number of colors used in the first image I1 using the clustering analysis. The first color adjuster 104 then extracts the section of the first image I1, which corresponds to the background section of the source image Io, and makes the pixels of the extracted section transparent. The first image storage 112 stores the first image I1, which is obtained from the first image processor 103. In this example, the processed first image I1 is stored with the file name "foreground" in the PNG format.

The second image processor 105 applies lossy compression method, such as Joint Photographic Experts Group (JPEG) or JPEG 2000, to the second image I2 to reduce the file size of the second image I2. In this example, the second color adjuster 106 of the second image processor 105 extracts the section of the second image I2, which corresponds to the foreground section of the source image Io, and assigns a uniform color to the pixels of the extracted section. The resolution controller 107 of the second image processor 105 may lower the resolution of the processed second image I2. The second image processor 105 may apply noise reduction or smoothing to further reduce the file size of the second image I2. The second image storage 113 stores the second image I2, which is obtained from the second image processor 105. In this example, the processed second image I2 is stored with the file name "background" in the JPEG format. Further, in this example, the second image I2 has the resolution, which is reduced by half of the resolution of the source image Io.

The size detector 110 detects size information of the source image Io, such as the pixel size of the source image Io, which may be obtained by multiplying the physical size of the source image Io and the resolution of the source image Io that are both obtained when the source image Io is input. Using the pixel size of the source image Io, the size detector 100 determines the pixel size of the first image I1 or the second image I2, while retaining the file size of the source image Io. For example, since the resolution of the first image I1 is equal to the resolution of the source image Io, the pixel size of the first image I1, which may be expressed by the width W1 (FIG. 3) and the height H1 (FIG. 3), is equal to the pixel size of the source image Io. Since the resolution of the second image I2 is half the resolution of the source image Io, the pixel size of the second image I2, which may be expressed by the width W2 (FIG. 3) and the height H2 (FIG. 3), is equal to half the pixel size of the source image Io. For example, when the source image Io has the pixel size of 200 pixels by 400 pixels and the resolution of 300 dpi, the first image I1 has the pixel size of W1=200 pixels by H1=400 pixels with the resolution of 300 dpi. The second image I2 has the pixel size of W2=100 pixels by H2=200 pixels with the resolution R2 of 150 dpi.

The HTML file generator 111 generates a HTML file LF, which describes appearance of the first image I1 and the second image I2 when they are displayed by the web browser 201 of the client apparatus 200. In this example, as illustrated in FIG. 3, the first image I1 and the second image I2 are combined into a compound image Ic for display. In order to combine the first image I1 and the second image I2, they need to be displayed with the same pixel sizes. For example, when the first image I1 has the pixel size of W1=200 pixels by H1=400 pixels, and the second image I2 has the pixel size of W2=100 pixels by H2=200 pixels, the compound image Ic is assumed to have the pixel size of W3=200 pixels by H3=400 pixels.

In this example, the HTML file may include a plurality of html tags including, for example, a first image tag indicating how the first image I1 is displayed, and a second image tag for indicating how the second image I2 is displayed, as illustrated below.

<html>
<head>
</head>
<body>
<img src="background.jpg" name="background" width="2480" height="3580" style="position:absolute;left:0px;top:0px">
<img src="foreground.jpg" name="foreground" width="2480" height="3580" style="position:absolute;left:0px;top:0px">
</body>
</html>

The first image tag instructs the web browser 201 to display the second image I2 having the file name "background", with the pixel size of 2480 pixel width by 3580 pixel height, at the position (0, 0) from the upper left position of the webpage. The second image tag instructs the web browser 201 to display the first image I1 having the file name "foreground", with the pixel size of 2480 pixel width by 3580 pixel height, at the position (0, 0) from the upper left position of the webpage.

The HTML file storage 114 stores the HTML file LF, which is obtained from the html file generator 111.

The web server 115 may send the first image I1 and the second image I2 together with the HTML file LF to the client apparatus 200 using the Hypertext Transfer Protocol (HTTP), upon receiving a user instruction from the client apparatus 200.

Upon receiving the first image I1, the second image I2, and the HTML file LF, the web browser 201 of the client apparatus 200 displays the first image I1 and the second image I2 according to information obtainable from the HTML file LF. For example, when the HTML file LF includes the above source code, the web browser 201 places the first image I1 and the second image I2 one above the other as a compound image Ic having the pixel size of 2480 pixel width by 3580 pixel height at the position (0, 0) from the upper left of the webpage.

In this manner, the compound image Ic having the file size smaller than the file size of the source image Io may be displayed without requiring installation of the plug-in, such as the PDF plug-in.

Figure 2:
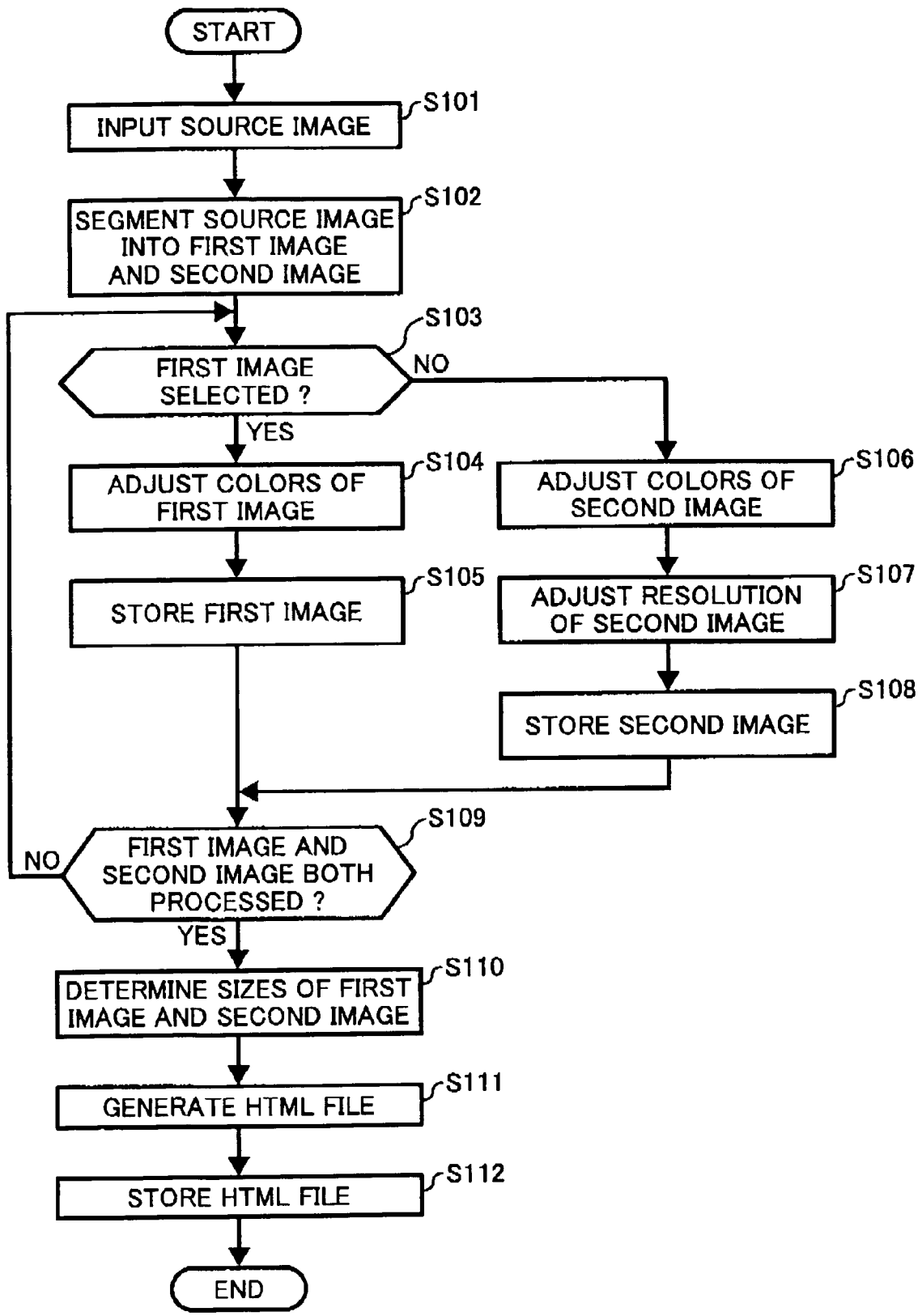
FIG. 2 is a flowchart illustrating operation of generating a formatting file according to an example embodiment of the present invention.

Referring now to FIGS. 2 and 3, operation of generating a HTML file is explained according to an example embodiment of the present invention. The operation of FIG. 2 may be performed by the image processing apparatus 100 upon receiving a user instruction from the client apparatus 200. In this example, the client apparatus 200 instructs the image processing apparatus 100 to generate a compound image Ic from a source image Io shown in FIG. 3.

Step S101 inputs the source image Io.

Step S102 segments the source image Io into a first image I1 and a second image I2, using any kind of image segmentation method.

Step S103 determines whether the first image I1 is selected for processing. If the first image I1 is selected ("YES" in Step S103, the operation proceeds to Step S104. Otherwise ("NO" in Step S103), the operation proceeds to Step S106.

Step S104 adjusts the colors of the first image I1, for example, by reducing the number of colors used in the first image I1. At this time, a section of the first image I1 corresponding to the background section of the source image Io may be assigned with a transparent color.

Step S105 stores the processed first image I1.

Step S106 adjusts the colors of the second image I2. For example, a section of the second image I2 corresponding to the foreground section of the source image Io may be assigned with a uniform color.

Step S107 reduces the resolution of the second image I2.

Step S108 stores the processed second image I2.

Step S109 determines whether the first image I1 and the second image I2 have been processed. If the first image I1 and the second image I2 have been both processed ("YES" in Step S109), the operation proceeds to Step S110. Otherwise ("NO" in step S109), the operation returns to Step S103.

Step S110 determines the pixel size of the first image I1 and the pixel size of the second image I2, using the pixel size of the source image Io.

Step S111 generates a HTML file LF, which describes how the first image I1 and the second image I2 are displayed.

Step S112 stores the HTML file LF, and the operation ends.

The operation of FIG. 2 may be performed in various other ways. For example, the position at which the first image I1 or the second image I2 is displayed may be set by default before generating the HTML file LF. The HTML file LF may include information indicating the display position of the first image I1 or the second image I2. For example, the size detector 110 may be provided with the additional function of determining the display position of the compound image Ic.

In the example described above referring to FIG. 1, 2, or 3, the pixel sizes of the first image I1 and the second image I2 are determined based on the size information, i.e., the pixel size, of the source image Io. In another example, the pixel sizes of the first image I1 and the second image I2 may be changed according to the user preference. For example, the pixel sizes of the first image I1 and the second image I2 may be changed when the size information, i.e., the pixel size, of the compound image Ic is changed using an input device of the client apparatus 200. In one example, the client apparatus 200 may resize the window or frame of the webpage. In another example, the client apparatus 200 may send a user instruction for requesting zooming in or out the compound image Ic.

When the size information of the compound image Ic is updated, the size detector 110 may update the pixel size of the first image I1 and/or the pixel size of the second image I2. Using the updated pixel size obtained by the size detector 110, the HTML file generator 111 generates an updated HTML file and stores the updated HTML file in the HTML file storage 114. The web sever 115 sends the updated HTML file to the web browser 201. Using the updated HTML file, the web browser 201 reloads the first image I1 and the second image I2 to display the compound image Ic having the requested pixel size.

In this example, the request size information of the compound image Ic may be notified to the image processing apparatus 100 via the user interface 116. In this example, the user interface 116 may include the interactive web technology, which may be operable at the server side, such as Common Gateway Interface (CGI), Server Side Include (SSI), or Active Server Pages (ASP). Alternatively, the user interface 116 may be included in the client apparatus 200, instead of being included in the image processing apparatus 100. When the user interface 116 is provided at the client side, the user interface 116 may use the interactive web technology, which may be operable at the client side, for example, Java applet or Active-X.

For example, the web browser 201 may send a HTTP request to the web server 115, which includes a user instruction for reducing the size of the compound image Ic by 30 percent. When the web server 115 recognizes the user instruction indicating the requested pixel size of the compound image Ic, the web server 115 activates the user interface 116. The user interface 116 causes the size detector 110 to recalculate the pixel sizes of the first image I1 and the second image I2, using the requested pixel size extracted from the user instruction for resizing. For example, when the pixel sizes of the first image I1 and the second image I2 are both 2480 pixel width by 3580 pixel height, the size detector 110 reduces the pixel sizes of the first image I1 and the second image I2, respectively, by 30%. Using the updated pixel sizes of the first image I1 and the second image I2, the HTML file generator 111 generates a HTML file described as follows.

<html>
<head>
</head>
<body>
<img src="background.jpg" name="background" width="744" height="1052" style="position:absolute;left:0px;top:0px">
<img src="foreground.jpg" name="foreground" width="744" height="1052" style="position:absolute;left:0px;top:0px">
</body>
</html>

In this manner, the client apparatus 200 may be able to freely change the pixel size of the compound image Ic.

Figure 4:
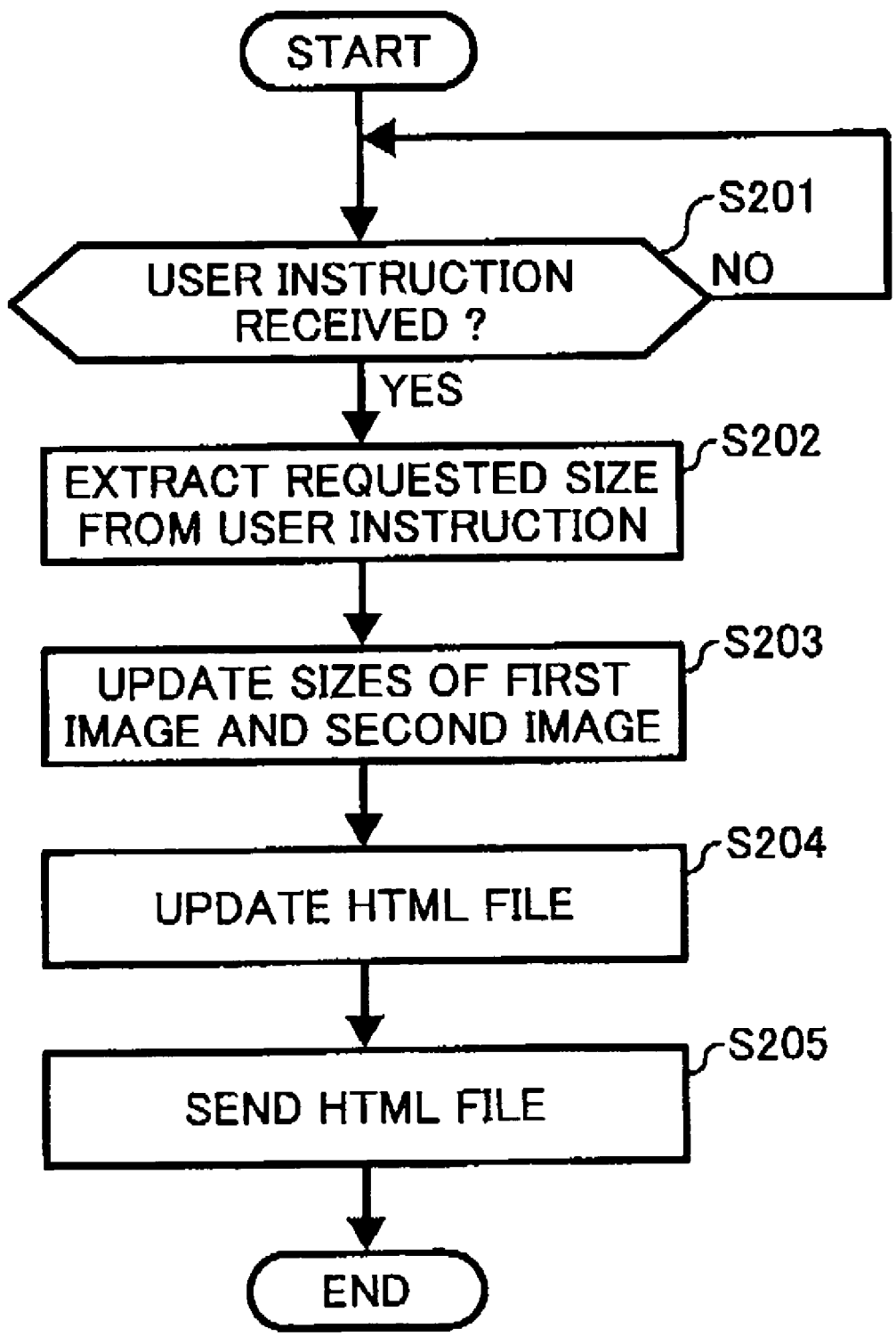
FIG. 4 is a flowchart illustrating operation of updating a formatting file based on a user instruction according to an example embodiment of the present invention.

Referring now to FIG. 4, operation of updating a HTML file is explained according to an example embodiment of the present invention. The operation of FIG. 4 may be performed by the image processing apparatus 100 upon receiving a user instruction from the client apparatus 200. In this example, the client apparatus 200 instructs the image processing apparatus 100 to resize the pixel size of a compound image Ic through the input device of the client apparatus 200.

Step S201 determines whether a user instruction for resizing the pixel size of the compound image Ic is received from the client apparatus 200. When the user instruction is received ("YES" in Step S201), the operation proceeds to Step S202. Otherwise ("NO" in Step S201), the operation repeats Step S201.

Step S202 extracts request size information of the compound image Ic from the user instruction.

Step S203 updates the pixel sizes of the first image I1 and the second image I2.

Step S204 updates the HTML file. At this time, the HTML file may be stored.

Step S205 sends the HTML file, and the operation ends.

The operation of FIG. 4 may be performed in various other ways. For example, the position at which the first image I1 or the second image I2 is displayed may be changed according to a user instruction, which includes request position information of the compound image Ic. The size detector 110 may be provided with the additional function of updating the display position of the compound image Ic according to the user instruction. In this example, the user instruction may be input from the input device of the client apparatus 200, for example, by moving a scroll bar on the webpage. The size detector 110 updates the display position using the request size information extracted from the user instruction. The HTML file generator 111 updates the HTML file LF using the updated display position, and sends the updated HTML file to the client apparatus 200. Based on the updated HTML file, the web browser 201 of the client apparatus 200 displays the compound image Ic at the requested position.

For example, the HTML file having the first image tag and the second image tag is assumed to be originally generated.

<img src="background.jpg" name="background" width="744" height="1052" style="position:absolute;left:0px;top:0px">
    <img src="foreground.jpg" name="foreground" width="744" height="1052" style="position:absolute;left:0px;top:0px">

When the request position information indicates the position of the compound image Ic to be moved 200 pixels right and 300 pixels down from the original position, i.e., the upper left position, of the webpage, the HTML file is updated as follows.

<img src="background.jpg" name="background" width="744" height="1052" style="position:absolute;left:200 px;top:300 px">
    <img src="foreground.jpg" name="foreground" width="744" height="1052" style="position:absolute;left:200 px;top:300 px">

In any one of the examples illustrated above referring to FIG. 1, 2, 3, or 4, the first image I1 and the second image I2 are both displayed by the web browser 201 of the client apparatus 200. Alternatively, at least one of the first image I1 and the second image I2 may be selected for display.

Figure 5A:
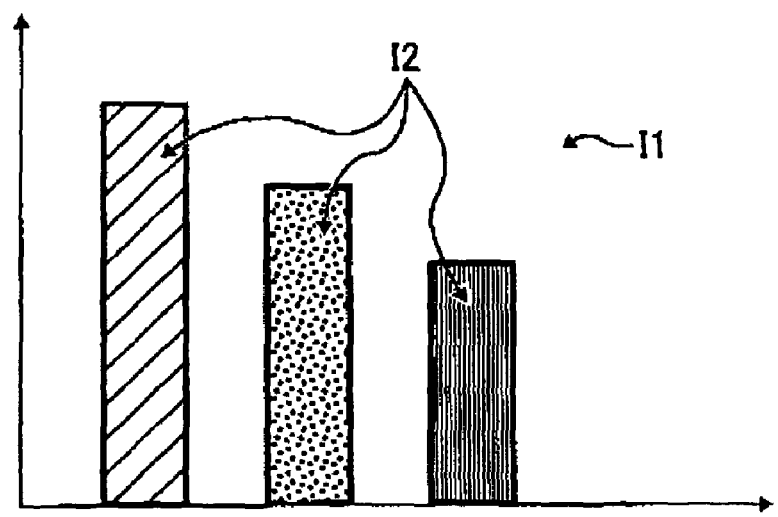
FIG. 5A is an example compound image displayed by combining a first image, a second image, and a formatting file.
Figure 5B:
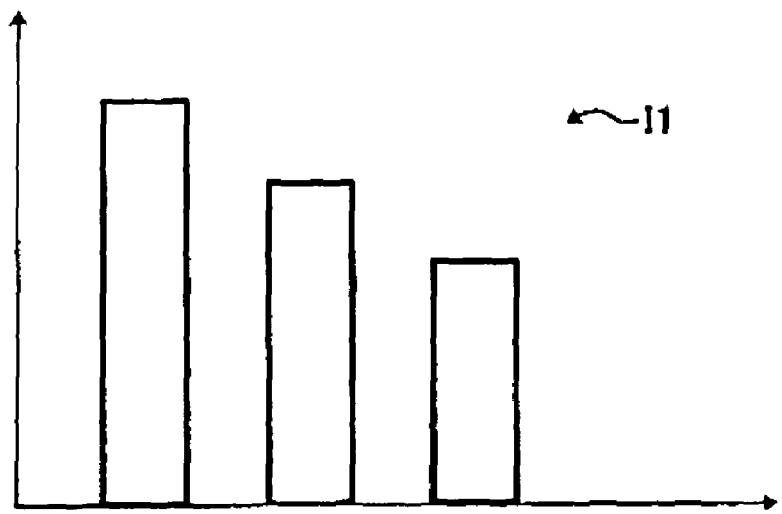
FIG. 5B is an example compound image displayed by combining a first image and a formatting file.

For example, a source image shown in FIG. 5A is input, which illustrates a bar graph. The source image of FIG. 5A is segmented into a first image I1 corresponding to the outline of the bar graph indicated by the black line, and a second image I2 corresponding to the patterned portion of the bar graph. In this example, the first image I1 is generated as a binary image, while the second image I2 is generated as a grayscale image. As illustrated in FIG. 5B, when outputting the bar graph, only the first image I1 may be selected for display. At this time, the size detector 110 determines the pixel size of the first image I1, using the size information of the source image Io. The HTML file generator 111 generates a HTML file, which describes how the first image I1 is displayed.

While the HTML file, generated by the image processing apparatus 100, may include various other HTML tags for describing how the compound image Ic is displayed on the webpage, the compound image Ic may not be displayed according to the HTML file when the HTML file includes a form tag. For example, as illustrated in FIG. 6, the compound image Ic is not displayed well if the form is displayed over the compound image Ic. The HTML file used for displaying the image of FIG. 6 may be described as follows.

```
<html>
<head>
</head>
<img src = "Moji_R06.jpg" name = "background" width = "1240" height = "1754" style = "position: absolute; lef; 0px; top: 0px">
<img src = "Moji_R06.png" name = "foreground" width = "1240" height = "1754" style = "position: absolute; lef; 0px; top: 0px">
<form method = "post" action = "mailto: email address? Subject = Page_enquete">
    <p>Name?<input type = "text" name = "info" value = "Input Name"/>
    <p>Sex?
        <input type = "radio" name = "your_sex_is" value = "male" checked = "checked"/ male>
        <input type = "radio" name = "your_sex_is" value = "female" />female</p>
    <p><input type = "submit" value = "send"/></p>
</form>
</body>
</html>
```

In order to correctly display the compound image Ic even with the form, the second image I2 is set as a background image. The image tag for indicating how the second image I2 having the file name "background" is displayed is replaced by the following tag:

<body background="Moji_R06.jpg">

Figure 7:
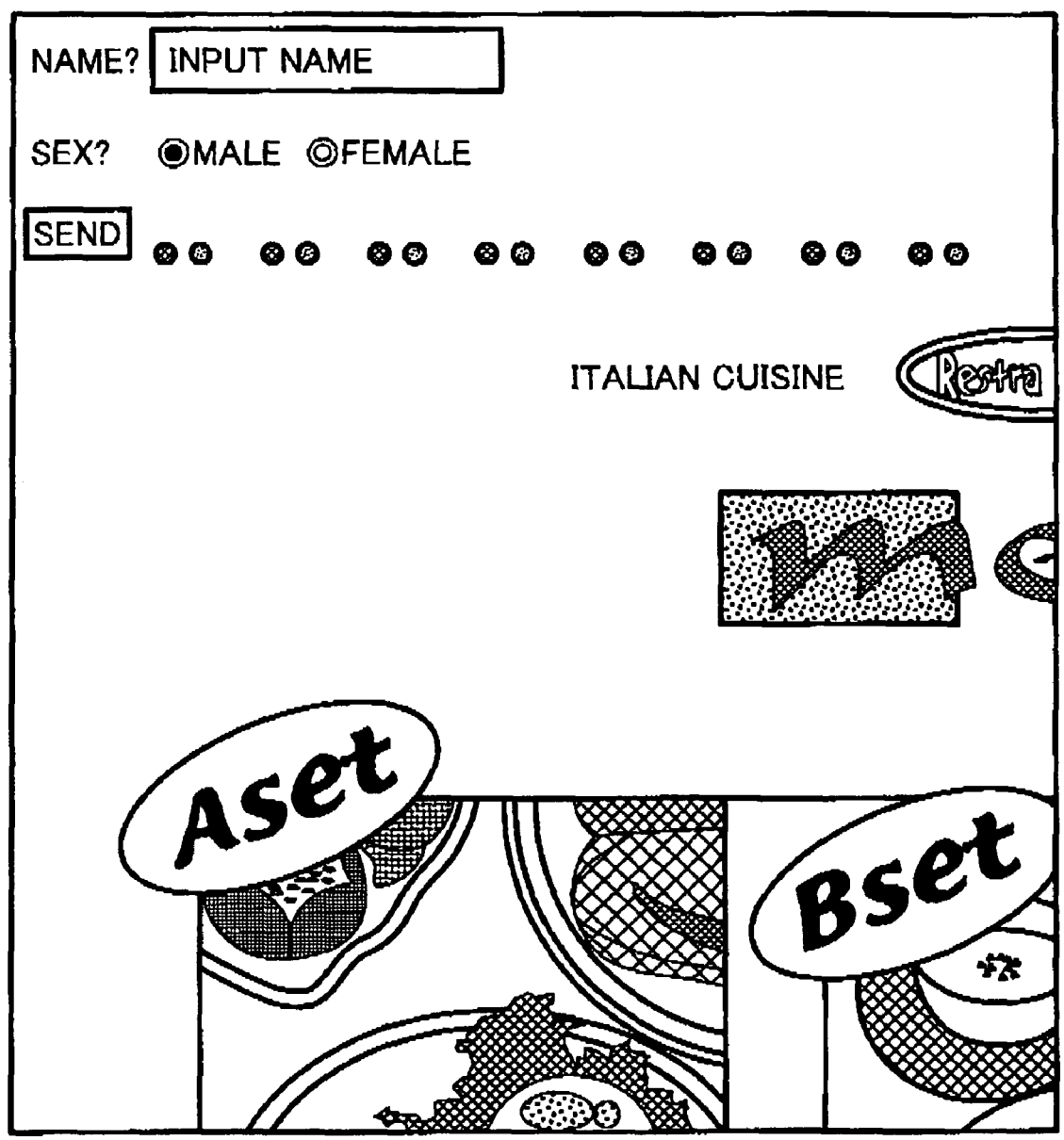
FIG. 7 is an illustration for explaining how a compound image is displayed when a form tag is used, when a second image is set as a background image.

In this manner, the form may be displayed over the second image I2 as illustrated in FIG. 7. Referring to FIG. 7, the form is displayed over the section of the first image I1, which is assigned with the transparent color.

Figure 8:
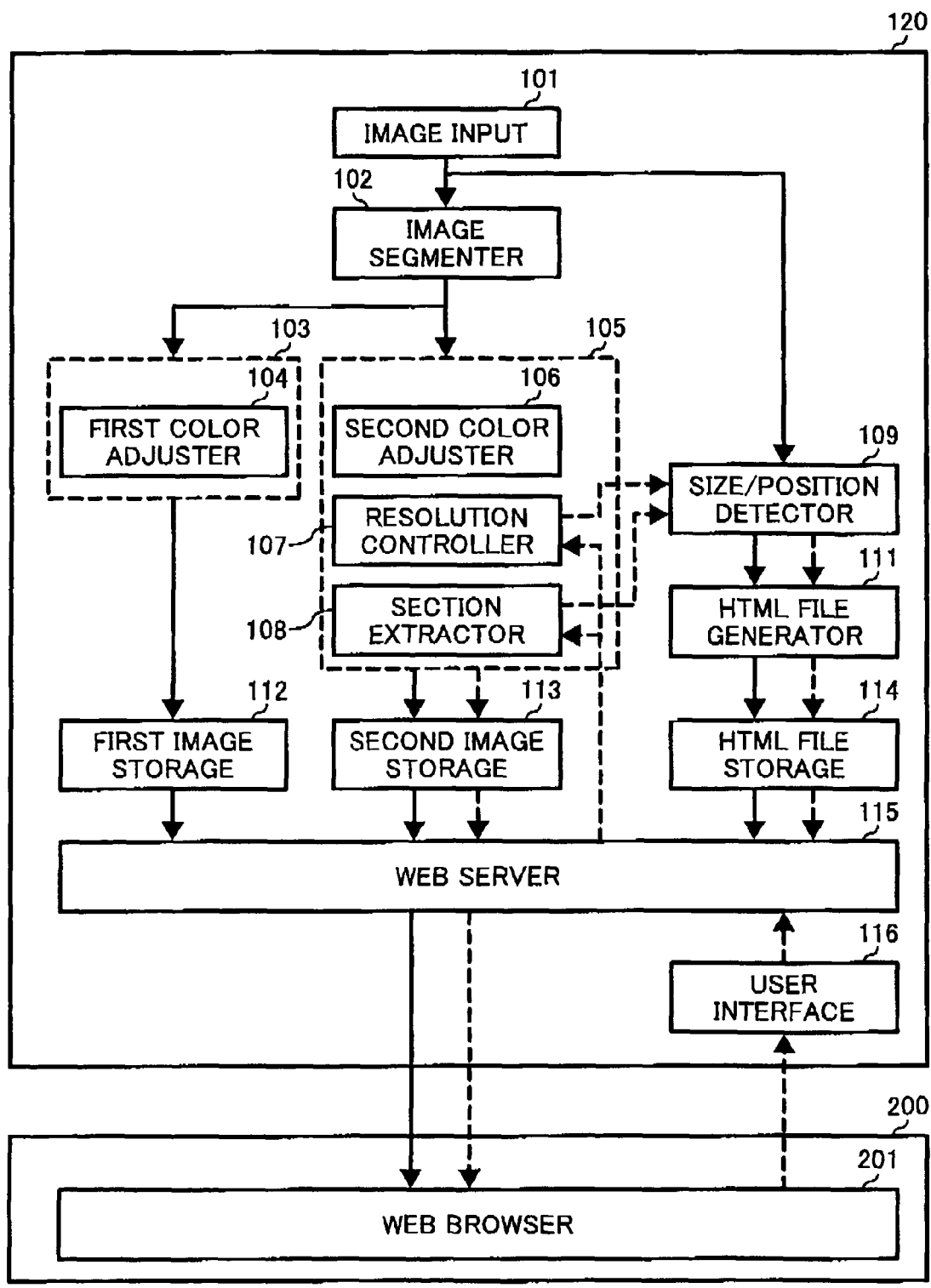
FIG. 8 is a schematic block diagram illustrating the functional structure of an image processing apparatus according to an example embodiment of the present invention.

However, since the second image I2 is set as the background image, the image processing apparatus 100 of FIG. 1 may not be able to adjust the pixel size or the position of the second image I2 according to the user instruction. In light of the above, the image processing apparatus 100 of FIG. 1 may be provided with the additional function, for example, as illustrated in FIG. 8. The image processing apparatus 120 of FIG. 8 is substantially similar in structure to the image processing apparatus 100 of FIG. 1. The differences include the addition of a section extractor 108 of the second image processor 105, and the replacement of the size detector 110 with a size/position detector 109.

Figure 9:
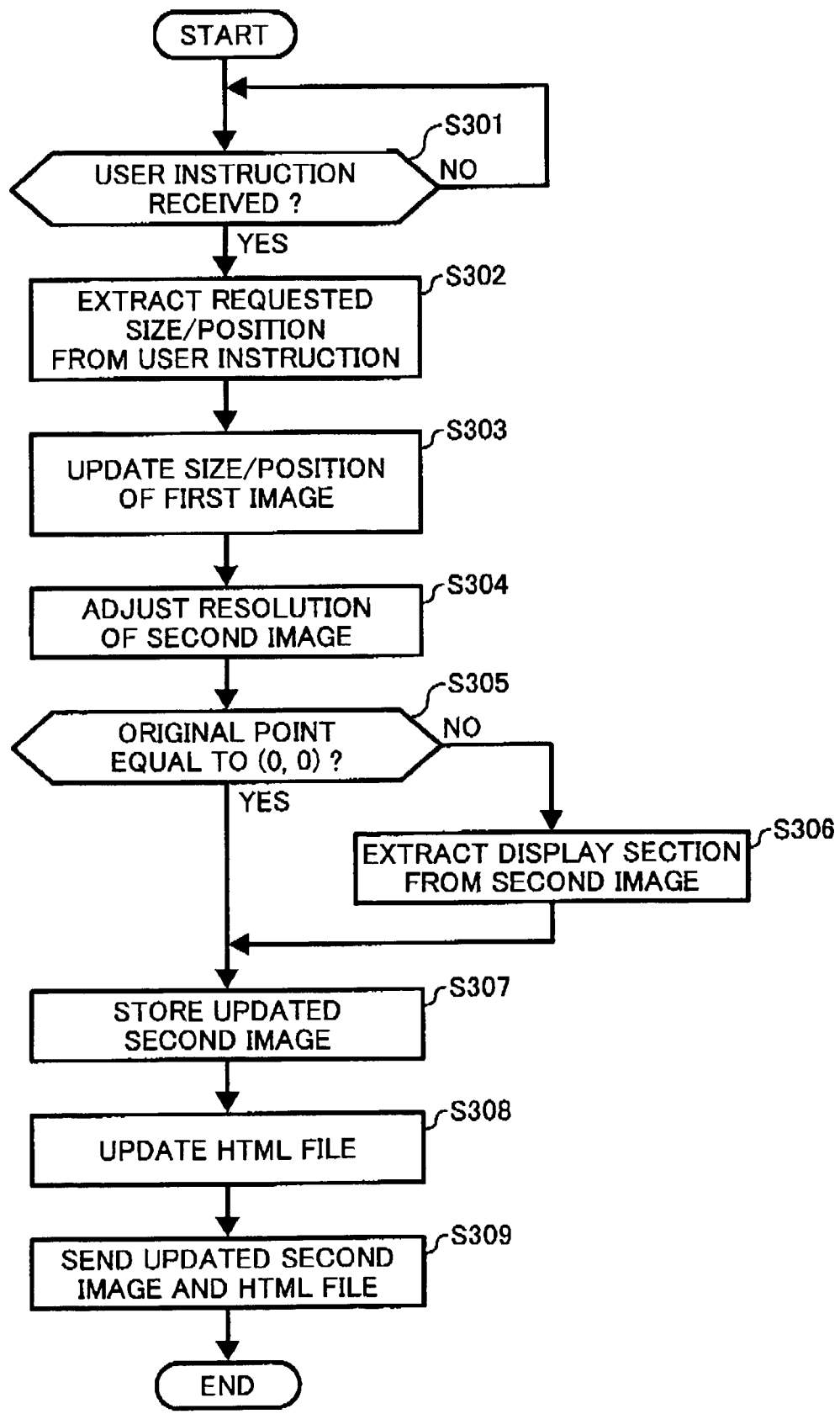
FIG. 9 is a flowchart illustrating operation of updating a formatting file based on a user instruction according to an example embodiment of the present invention.

Referring now to FIG. 9, operation of updating an HTML file is explained according to an example embodiment of the present invention. The operation of FIG. 9 may be performed by the image processing apparatus 120 upon receiving a user instruction from the client apparatus 200. In this example, the client apparatus 200 instructs the image processing apparatus 120 to update the pixel size and the displayed position of a compound image Ic, which includes the form, through the input device of the client apparatus 200.

Step S301 determines whether a user instruction for updating the pixel size and the position of the compound image Ic is received from the client apparatus 200. When the user instruction is received ("YES" in Step S201), the operation proceeds to Step S302. Otherwise ("NO" in Step S301), the operation repeats Step S301.

Step S302 extracts the request size information and the request position information from the user instruction.

Step S303 updates the pixel size of the first image I1 using the request size information. Step S303 further updates the position at which the first image I1 is displayed using the request position information.

Step S304 adjusts the image size of the second image I2 using the request size information. In this step, the resolution controller 107 of the second image processor 105 may recreate a second image I2, using the request size information. Accordingly, the file size of the second image I2 may be changed.

Step S305 determines whether the original point, i.e., the upper left point of the webpage, of the second image I2, which may be obtained from the request position information, is equal to (0, 0). When the requested original point is equal to (0, 0) ("YES" in Step S305), the operation proceeds to Step S307. Otherwise ("NO" in Step S305), the operation proceeds to Step S306.

Step S306 extracts a section to be displayed from the recreated second image, using the request position information.

Step S307 stores the recreated second image I2, which may be obtained from the resolution controller 107 or the section extractor 108 of the second image processor 105.

Step S308 updates the HTML file LF, using the request size information, the request position information, and the recreated second image I2. At this time, the updated HTML file LF may be stored.

Step S309 sends the recreated second image I2 together with the updated HTML file, and the operation ends.

The operation of FIG. 9 may be performed in various other ways. For example, at least one of the pixel size and the position of the compound image Ic may be changed according to a user instruction.

For example, the HTML file having the following tags is assumed to be generated.

<body background="Moji_R06.jpg">
<img src="Moji_R06.png" name="foreground" width="2480" height="3508" style="position: absolute; lef; 0px; top: 0px">

When the request position information indicates the position of the compound image Ic to be moved 200 pixels right and 300 pixels down from the original position, i.e., the upper left position, of the webpage, the HTML file is updated as follows.

<body background="background"200-300.jpg">
<img src="Moji_R06.png" name="foreground" width="2480" height="3508" style="position: absolute; lef; 0px; top: 0px">

In this example, the above-described background image is generated by extracting a section of the second image I2 from the requested original point (−200, −300) relative to the original point (0, 0).

When the requested pixel size of the compound image Ic is smaller by 50% than the original pixel size of the compound image Ic, the HTML file is updated as follows.

<body background="background50%.jpg">
<img src="Moji_R06.png" name="foreground" width="1240" height="1754" style="position: absolute; lef; 0px; top: 0px">

In this example, the image size of the second image I2 is made smaller by 50% than the original image size of the second image I2.

When using the form, the resolution of the first image I1 and the resolution of the second image I2 are made equal to each other.

In this manner, upon receiving a user instruction for reducing the pixel size of the compound image Ic, a section used for display is extracted from the second image I2, thus reducing the time required for loading the image.

While the image processing apparatus 100 of FIG. 1 or the image processing apparatus 120 of FIG. 8 improves accessibility, managing a plurality of images may not be easily performed. When a number of images is relatively large, the images may be managed using the Open Document Format for Office Applications ("OpenOffice format"), as illustrated in FIG. 10 or 11.

Figure 10:
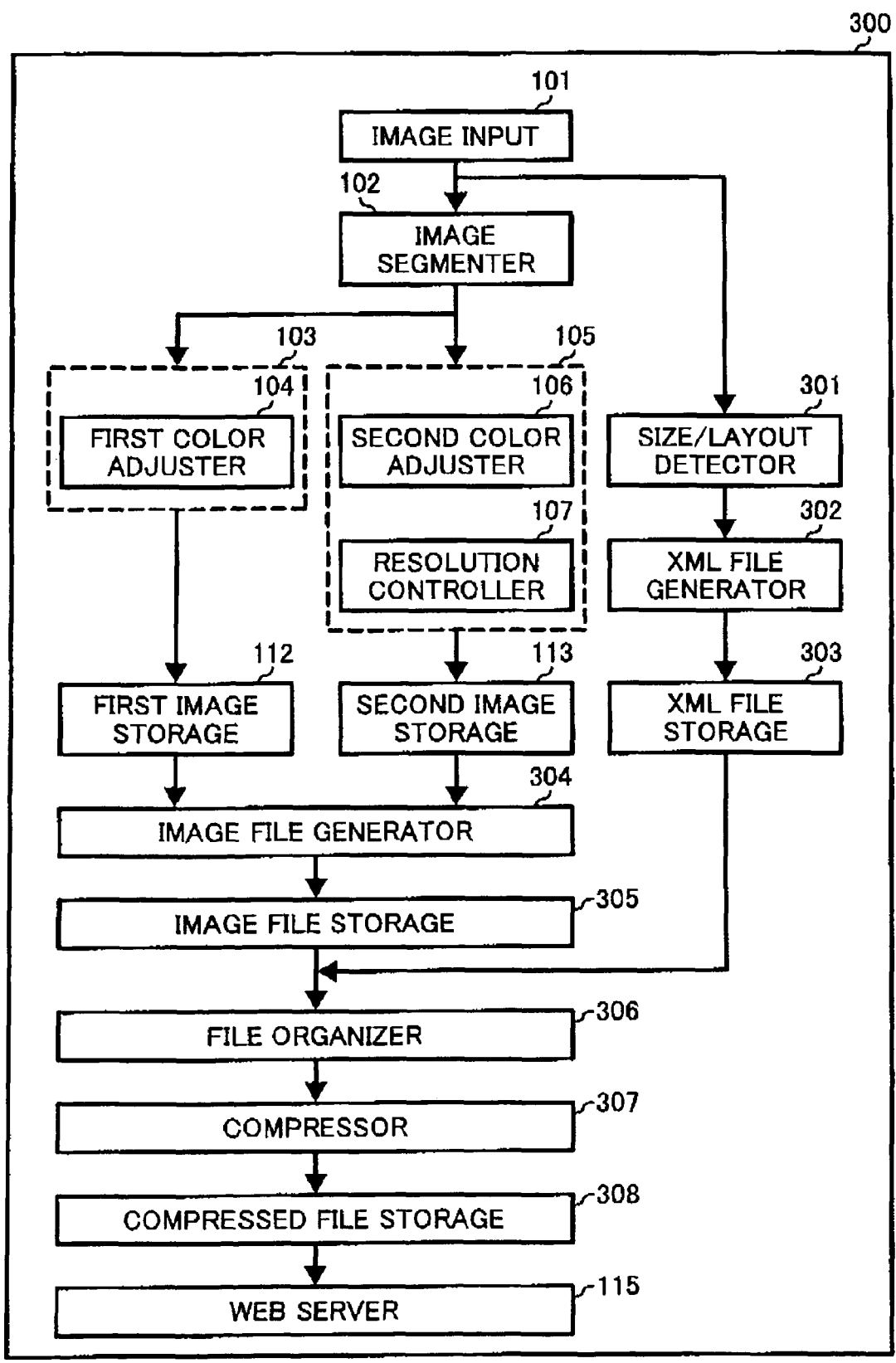
FIG. 10 is a schematic block diagram illustrating the functional structure of an image processing apparatus according to an example embodiment of the present invention.
Figure 11:
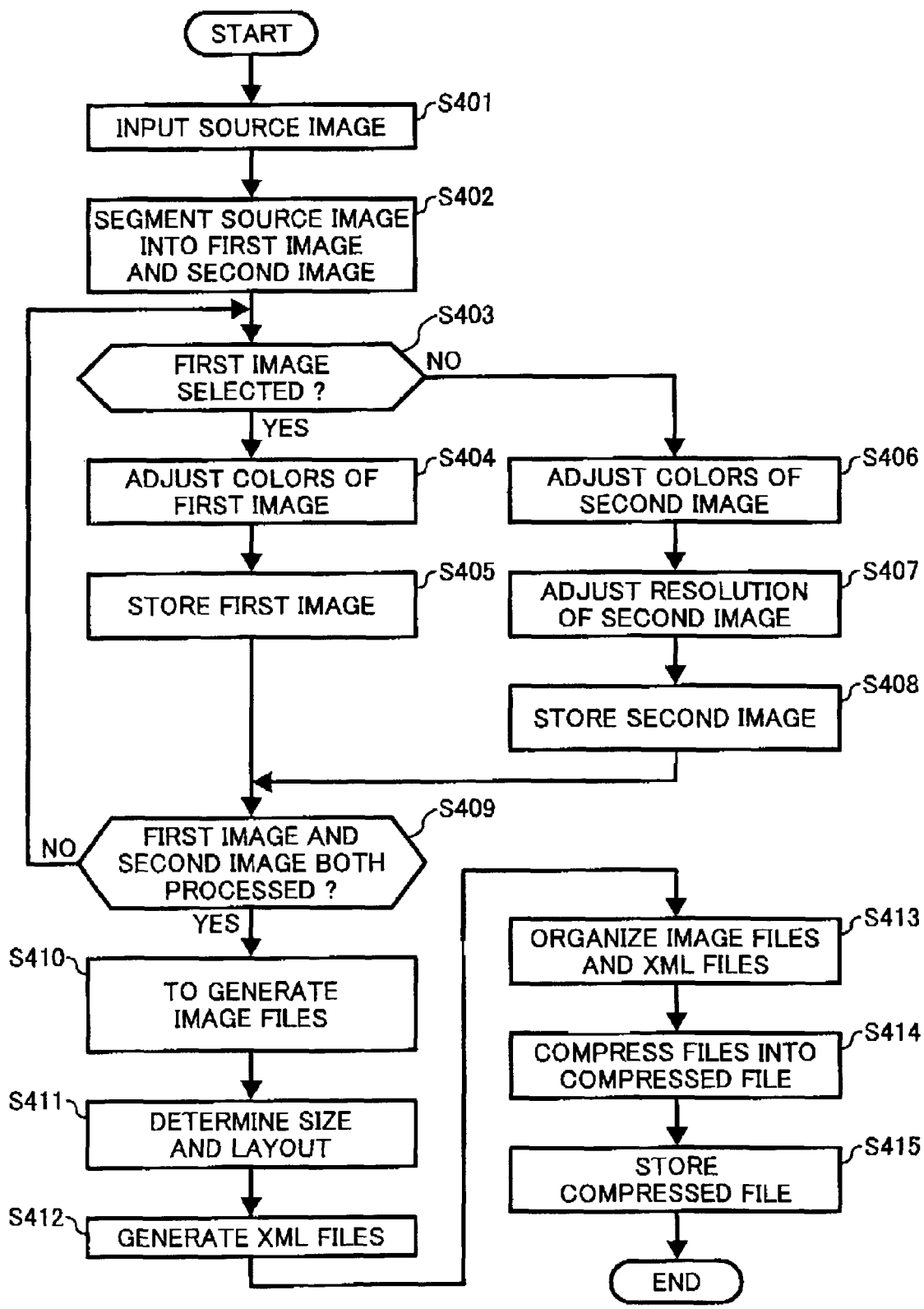
FIG. 11 is a flowchart illustrating operation of generating a compressed file including a formatting file, performed by the image processing apparatus shown in FIG. 10, according to an example embodiment of the present invention.

Referring now to FIG. 10, the functional structure of an image processing apparatus 300 is explained according to an example embodiment of the present invention. The image processing apparatus 300 is capable of managing a plurality of image files more effectively using the OpenOffice format.

As shown in FIG. 10, the image processing apparatus 300 includes the image input 101, the image segmenter 102, the first image processor 103 provided with the first color adjuster 104, the second image processor 105 provided with the second color adjuster 106 and the resolution controller 107, the first image storage 112, the second image storage 113, the web serer 115, a size/layout detector 301, an XML file generator 302, an XML file storage 303, an image file generator 304, an image file storage 305, a file organizer 306, a compressor 307, and a compressed file storage 308.

The image input 101, the image segmenter 102, the first image processor 103, the second image processor 105, the first image storage 112, and the second image storage 113 function in a similar manner as described referring to FIG. 1.

The image file generator 304, which may be implemented by a writer, generates a plurality of image files. The image file may be embedded with one or more images. For example, the image file generator 304 may generate a first image file, which corresponds to the first page of the image files, having a first foreground image and a first background image. The image file generator 304 may further generate a second image file, which corresponds to the second page of the image files, having a second foreground image and a second background image. The plurality of image files is then stored in the image file storage 305.

The size/layout detector 301 determines size or layout for each of the image files stored in the image file storage 305, using size information of the source image input by the image input 101. The XML file generator 302 generates a plurality of XML files based on the size or layout determined by the size/layout detector 301. For example, the XML file generator 302 may generate the file called "content.xml" that carries the actual content of the document, the file called "styles.xml" that stores information regarding the style or layout, the file called "meta.xml" that contains the file metadata, or the file called "settings.xml" that specifies the zoom factor or the cursor position.

The file organizer 306 determines how the plurality of image files and XML files is organized using the folder or file system. Based on the organization determined by the file organizer 306, the compressor 307 compresses the plurality of image files and XML files into a compressed file using the ZIP format. The compressed file storage 308 stores the compressed file. The web server 115 sends the compressed file to a client apparatus via a network.

Referring now to FIG. 11, operation of generating a compressed file is explained according to an example embodiment of the present invention. The operation of FIG. 11 may be performed by image processing apparatus 300 of FIG. 10 upon receiving an instruction for generating a compressed file.

Step S401 inputs a source image.

Step S402 segments the source image into a first image and a second image, using any kind of image segmentation method.

Step S403 determines whether the first image is selected for processing. If the first image is selected ("YES" in Step S403), the operation proceeds to Step S404. Otherwise ("NO" in Step S403), the operation proceeds to Step S406.

Step S404 adjusts the colors of the first image, for example, by reducing the number of colors used in the first image. At this time, a section of the first image corresponding to the background section of the source image may be assigned with a transparent color.

Step S405 stores the first image.

Step S406 adjusts the colors of the second image. For example, a section of the second image corresponding to the foreground section of the source image may be assigned with a uniform color.

Step S407 reduces the resolution of the second image.

Step S408 stores the second image.

Step S409 determines whether the first image and the second image have been processed. If the first image and the second image have been both processed ("YES" in Step S409), the operation proceeds to Step S410. Otherwise ("NO" in step S409), the operation returns to Step S403.

Step S410 generates a plurality of image files, for example, using the first image and the second image.

Step S411 determines the size or layout for each of the image files.

Step S412 generates a plurality of XML files, which together describe the determined size or layout.

Step S413 organizes the plurality of image files and XML files.

Step S414 compresses the plurality of image files and XML files into a compressed file.

Step S415 stores the compressed file, and the operation ends.

The operation of FIG. 11 may be performed in various other ways.

Figure 12:
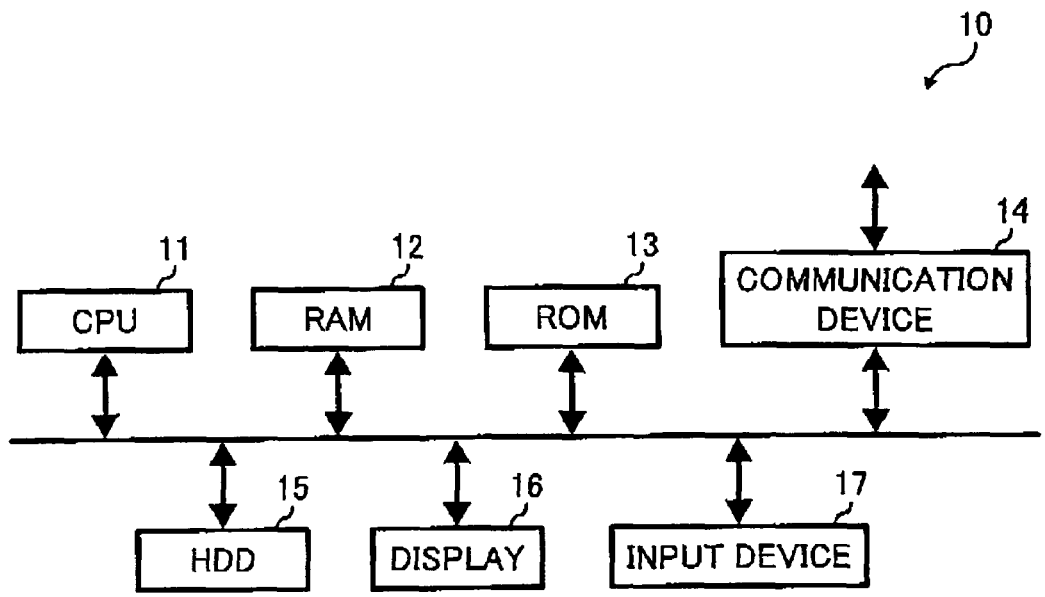
FIG. 12 is a schematic block diagram illustrating the hardware structure of an image processing apparatus according to an example embodiment of the present invention.
Figure 13:
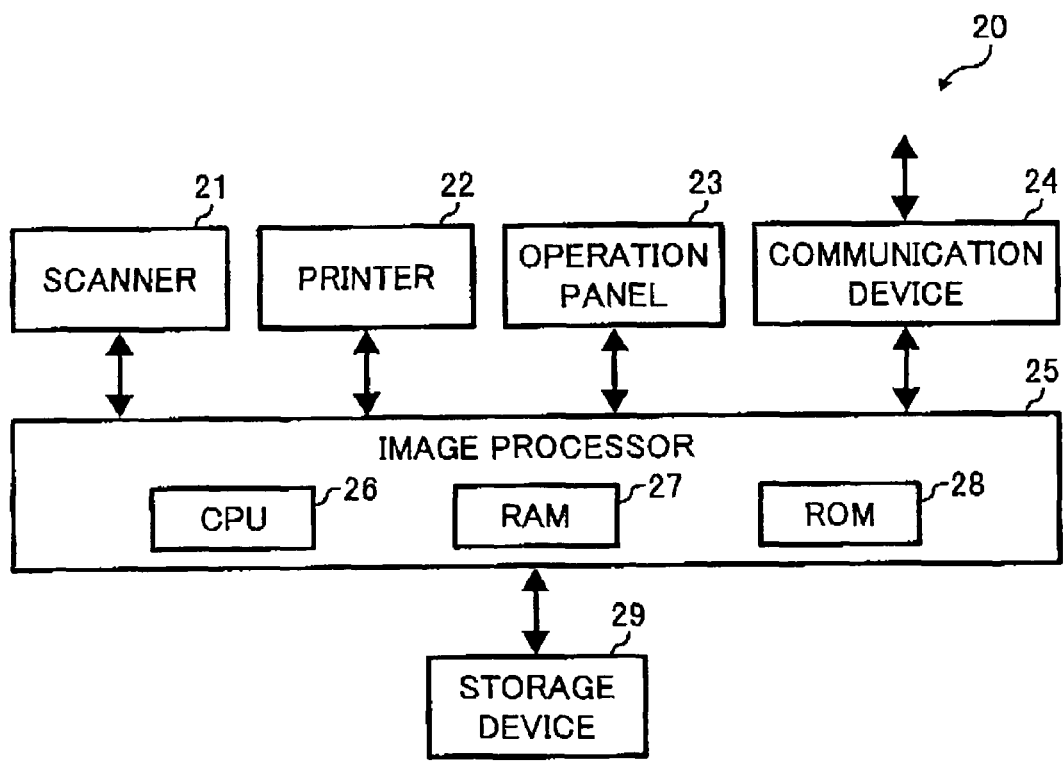
FIG. 13 is a schematic block diagram illustrating the hardware structure of an image processing apparatus according to an example embodiment of the present invention.

Any one of the image processing apparatuses described above may be implemented by, for example, an image processing apparatus 10 shown in FIG. 12 or an image processing apparatus 20 shown in FIG. 13.

Referring to FIG. 12, the image processing apparatus 10 includes a central processing unit (CPU) 11, a random access memory (RAM) 12, a read only memory (ROM) 13, a communication device 14, a hard disk drive (HDD) 15, a display 16, and an input device 17. The CPU 11 may be implemented by any kind of processor capable of controlling operation of the image processing apparatus 10. The RAM 12 may function as a work area of the CPU 11. The ROM 13 may store various data including, for example, an image processing program of the present invention. The image processing program may be loaded from a storage medium, such as an optical disc, using an optical disc drive. Alternatively, the image processing program may be downloaded from a network via the communication device 14. The communication device 14 allows the image processing apparatus 10 to communicate with other apparatuses via a network. The HDD 15 may be implemented by a storage capable of storing a large amount of data. The display 16 may be implemented by, for example, a liquid crystal display (LCD), capable of displaying various data. The input device 17 may be implemented by a pointing device, a keyboard, etc., capable of inputting a user instruction.

Referring to FIG. 13, the image processing apparatus 20 includes a scanner 21, a printer 22, an operation panel 23, a communication device 24, an image processor 25 including a CPU 26, a RAM 27, and a ROM 28, and a storage device 29.

The scanner 21 may be implemented by any kind of scanner, which may be provided with a charged coupled device (CCD) or an auto document feeder (ADF). In one example operation, the scanner 21 may scan an original document into a scanned image, and input the scanned image as a source image. The printer 22 is capable of printing the scanned image, or the processed image processed by the image processor 25, on a recording sheet. The storage device 29 may store various data, including the scanned image, the processed image, user preference data, system parameters, etc.

The communication device 24 allows the image processing apparatus 20 to communicate with other apparatuses via a network. The network may include a local area network (LAN), the Internet, or a public switched telephone network. The operation panel 23 may be provided with an input device including various kinds of keys or a ten key, and an output device including a display.

The image processor 25 applies various image processing to the scanned image, which is obtained by the scanner 21, and stores the processed image in the storage device 29. Upon receiving a user instruction for displaying the processed image through the operation panel 23, the image processor 25 reads out the processed image, and displays the processed image on the output device of the operation panel 23.

Numerous additional modifications and variations are possible in light of the above teachings. It is therefore to be understood that within the scope of the appended claims, the disclosure of this patent specification may be practiced in ways other than those specifically described herein.

For example, elements and/or features of different illustrative embodiments may be combined with each other and/or substituted for each other within the scope of this disclosure and appended claims.

In another example, a source image may not be a multi-value image as described above referring to FIG. 3, as long as the source image can be segmented into a foreground section and a background section. Further, the source image may be a plurality of document images, which may be organized together as one file.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, involatile memory cards, ROM (read-only-memory), etc.

Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

The invention claimed is:

1. An image processing apparatus, comprising:
    means for segmenting a source image having a foreground section and a background section into a first image corresponding to the foreground section and a second image corresponding to the background section;
    means for determining a pixel size of the first image to be displayed and a pixel size of the second image to be displayed using size information of the source image, wherein the size information indicates a pixel size of the source image obtained from a physical size of the source image and a resolution of the source image;
    means for generating a formatting file based on a markup language, wherein the formatting file indicates the pixel size of the first image and the pixel size of the second image respectively determined by the means for determining;
    means for applying first image processing to the first image corresponding to the foreground section, wherein the first image processing includes processing that causes a section of the first image corresponding to the background section of the source image to be assigned with a transparent color;

means for applying second image processing to the second image corresponding to the background section, wherein the second image processing includes processing that causes a file size of the second image to be less than a file size of the source image; and means for sending a compound image to a client apparatus for display via a network, wherein the compound image is generated by combining the first image and the second image with the formatting file such that the first image and the second image are displayed with the same size and at the same position when the compound image is displayed through the client apparatus, wherein the means for determining further determines a display position of the first image to be displayed and a display position of the second image to be displayed, and the formatting file further indicates the display position of the first image and the display position of the second image respectively determined by the means for determining, and wherein the means for determining updates the pixel size of the first image or the pixel size of the second image according to request size information obtainable from a user instruction for resizing a pixel size of the compound image received from the client apparatus, and the means for generating updates the formatting file when the pixel size of the first image or the pixel size of the second image is updated, wherein the first image and the second image of the compound image are displayed according to the updated formatting file.

2. The apparatus of claim 1, wherein the formatting file further indicates that the compound image is to be displayed with a form, the means for generating generates the formatting file which further indicates that the second image is to be displayed as a background image so as to cause the form to be displayed over the section of the first image that is assigned with the transparent color.

3. The apparatus of claim 1, wherein the compound image is generated by combining selected one of the first image and the second image with the formatting file.

4. An image processing apparatus, comprising:

means for segmenting a source image having a foreground section and a background section into a first image corresponding to the foreground section and a second image corresponding to the background section;

means for determining a pixel size of the first image to be displayed and a pixel size of the second image to be displayed using size information of the source image, wherein the size information indicates a pixel size of the source image obtained from a physical size of the source image and a resolution of the source image;

means for generating a formatting file based on a markup language, wherein the formatting file indicates the pixel size of the first image and the pixel size of the second image respectively determined by the means for determining;

means for applying first image processing to the first image corresponding to the foreground section, wherein the first image processing includes processing that causes a section of the first image corresponding to the background section of the source image to be assigned with a transparent color;

means for applying second image processing to the second image corresponding to the background section, wherein the second image processing includes processing that causes a file size of the second image to be less than a file size of the source image; and means for sending a compound image to a client apparatus for display via a network, wherein the compound image is generated by combining the first image and the second image with the formatting file such that the first image and the second image are displayed with the same size and at the same position when the compound image is displayed through the client apparatus, wherein the means for determining further determines a display position of the first image to be displayed and a display position of the second image to be displayed, and the formatting file further indicates the display position of the first image and the display position of the second image respectively determined by the means for determining, and wherein the means for determining updates the display position of the first image or the display position of the second image according to request position information obtainable from a user instruction for changing a display position of the compound image received from the client apparatus, and the means for generating updates the formatting file when the display position of the first image or the display position of the second image is updated, wherein the first image and the second image of the compound image are displayed according to the updated formatting file.

5. The apparatus of claim 4, wherein the formatting file further indicates that the compound image is to be displayed with a form, the means for generating generates the formatting file which further indicates that the second image is to be displayed as a background image so as to cause the form to be displayed over the section of the first image that is assigned with the transparent color.

6. The apparatus of claim 4, wherein the compound image is generated by combining selected one of the first image and the second image with the formatting file.

7. A method, implemented on an image processing apparatus, for controlling format of a compound image, the method comprising:

inputting a source image of the compound image through an input device, wherein the source image has a foreground section and a background section;

using a processor to perform an image processing method, the method comprising:

segmenting the source image into a first image corresponding to the foreground section of the source image and a second image corresponding to the background section of the source image;

determining a pixel size of the first image to be displayed and a pixel size of the second image to be displayed using size information of the source image, the size information indicates a pixel size of the source image obtained from a physical size of the source image and a resolution of the source image;

generating a formatting file based on a markup language, wherein the formatting file indicates the pixel size of the first image and the pixel size of the second image respectively determined by the step of determining;

determining a display position of the first image to be displayed and a display position of the second image to be displayed, wherein the formatting file further indicates the display position of the first image and the display position of the second image respectively determined by the step of determining;

applying first image processing to the first image corresponding to the foreground section, wherein the first image processing includes processing that causes a section of the first image corresponding to the background section of the source image to be assigned with a transparent color;

applying second image processing to the second image corresponding to the background section, wherein the second image processing includes processing that causes a file size of the second image to be less than a file size of the source image;

sending a compound image to a client apparatus for display via a network, wherein the compound image is generated by combining the first image and the second image with the formatting file such that the first image and the second image are displayed with the same size and at the same position when the compound image is displayed through the client apparatus;

updating the pixel size of the first image or the pixel size of the second image according to request size information obtainable from a user instruction for resizing a pixel size of the compound image; and updating the formatting file when the pixel size of the first image or the pixel size of the second image is updated, wherein the first image and the second image of the compound image are displayed according to the updated formatting file.

8. A method, implemented on an image processing apparatus, for controlling format of a compound image, the method comprising:

inputting a source image of the compound image through an input device, wherein the source image has a foreground section and a background section;

using a processor to perform an image processing method, the method comprising:

segmenting the source image into a first image corresponding to the foreground section of the source image and a second image corresponding to the background section of the source image;

determining a pixel size of the first image to be displayed and a pixel size of the second image to be displayed using size information of the source image, the size information indicates a pixel size of the source image obtained from a physical size of the source image and a resolution of the source image;

generating a formatting file based on a markup language, wherein the formatting file indicates the pixel size of the first image and the pixel size of the second image respectively determined by the step of determining;

determining a display position of the first image to be displayed and a display position of the second image to be displayed, wherein the formatting file further indicates the display position of the first image and the display position of the second image respectively determined by the step of determining;

applying first image processing to the first image corresponding to the foreground section, wherein the first image processing includes processing that causes a section of the first image corresponding to the background section of the source image to be assigned with a transparent color;

applying second image processing to the second image corresponding to the background section, wherein the second image processing includes processing that causes a file size of the second image to be less than a file size of the source image;

updating the display position of the first image or the display position of the second image according to request position information obtainable from a user instruction for changing a display position of the compound image; and updating the formatting file when the display position of the first image or the display position of the second image is updated, wherein the first image and the second image of the compound image are displayed according to the updated formatting file.

9. A non-transitory computer readable storage medium storing computer instructions which when executed by a computer cause the computer to perform an image processing method, the method comprising:

inputting a source image of the compound image, wherein the source image has a foreground section and a background section;

segmenting the source image into a first image corresponding to the foreground section of the source image and a second image corresponding to the background section of the source image;

determining a pixel size of the first image to be displayed and a pixel size of the second image to be displayed using size information of the source image, wherein the size information indicates a pixel size of the source image obtained from a physical size of the source image and a resolution of the source image; and generating a formatting file based on a markup language, wherein the formatting file indicates the pixel size of the first image and the pixel size of the second image respectively determined by the step of determining;

determining a display position of the first image to be displayed and a display position of the second image to be displayed, wherein the formatting file further indicates the display position of the first image and the display position of the second image respectively determined by the step of determining;

applying first image processing to the first image corresponding to the foreground section, wherein the first image processing includes processing that causes a section of the first image corresponding to the background section of the source image to be assigned with a transparent color;

applying second image processing to the second image corresponding to the background section, wherein the second image processing includes processing that causes a file size of the second image to be less than a file size of the source image;

updating the display position of the first image or the display position of the second image according to request position information obtainable from a user instruction for changing a display position of the compound image; and updating the formatting file when the display position of the first image or the display position of the second image is updated, wherein the first image and the second image of the compound image are displayed according to the updated formatting file.

10. An image processing system, comprising:

a processor; and a storage device that stores a plurality of instructions which causes the processor to segment a source image having a foreground section and a background section into a first image corresponding to the foreground section and a second image corresponding to the background section;

determine a pixel size of the first image to be displayed and a pixel size of the second image to be displayed using size information of the source image, wherein the size information indicates a pixel size of the source image obtained from a physical size of the source image and a resolution of the source image;

generate a formatting file based on a markup language, wherein the formatting file indicates the pixel size of the first image and the pixel size of the second image respectively determined by the processor, apply first image processing to the first image corresponding to the foreground section, wherein the first image processing includes processing that causes a section of the file image corresponding to the background section of the source image to be assigned with a transparent color;

apply second image processing to the second image corresponding to the background section, wherein the second image processing includes processing that causes a file size of the second image to be less than a file size of the source image;

send a compound image to a client apparatus for display via a network, wherein the compound image is generated by combining the first image and the second image with the formatting file such that the first image and the second image are displayed with the same size and at the same position when the compound image is displayed through the client apparatus, determine a display position of the first image to be displayed and a display position of the second image to be displayed, and the formatting file further indicates the display position of the first image and the display position of the second image respectively determined, and update the pixel size of the first image or the pixel size of the second image according to request size information obtainable from a user instruction for resizing a pixel size of the compound image received from the client apparatus, and update the formatting file when the pixel size of the first image or the pixel size of the second image is updated, wherein the first image and the second image of the compound image are displayed according to the updated formatting file.

11. The image processing system of claim 10, wherein the processor updates the display position of the first image or the display position of the second image according to request position information obtainable from a user instruction for changing a display position of the compound image received from the client apparatus, and the processor updates the formatting file when the display position of the first image or the display position of the second image is updated, wherein the first image and the second image of the compound image are displayed according to the updated formatting file.

* * * * *